United States Patent Office 2,913,514
Patented Nov. 17, 1959

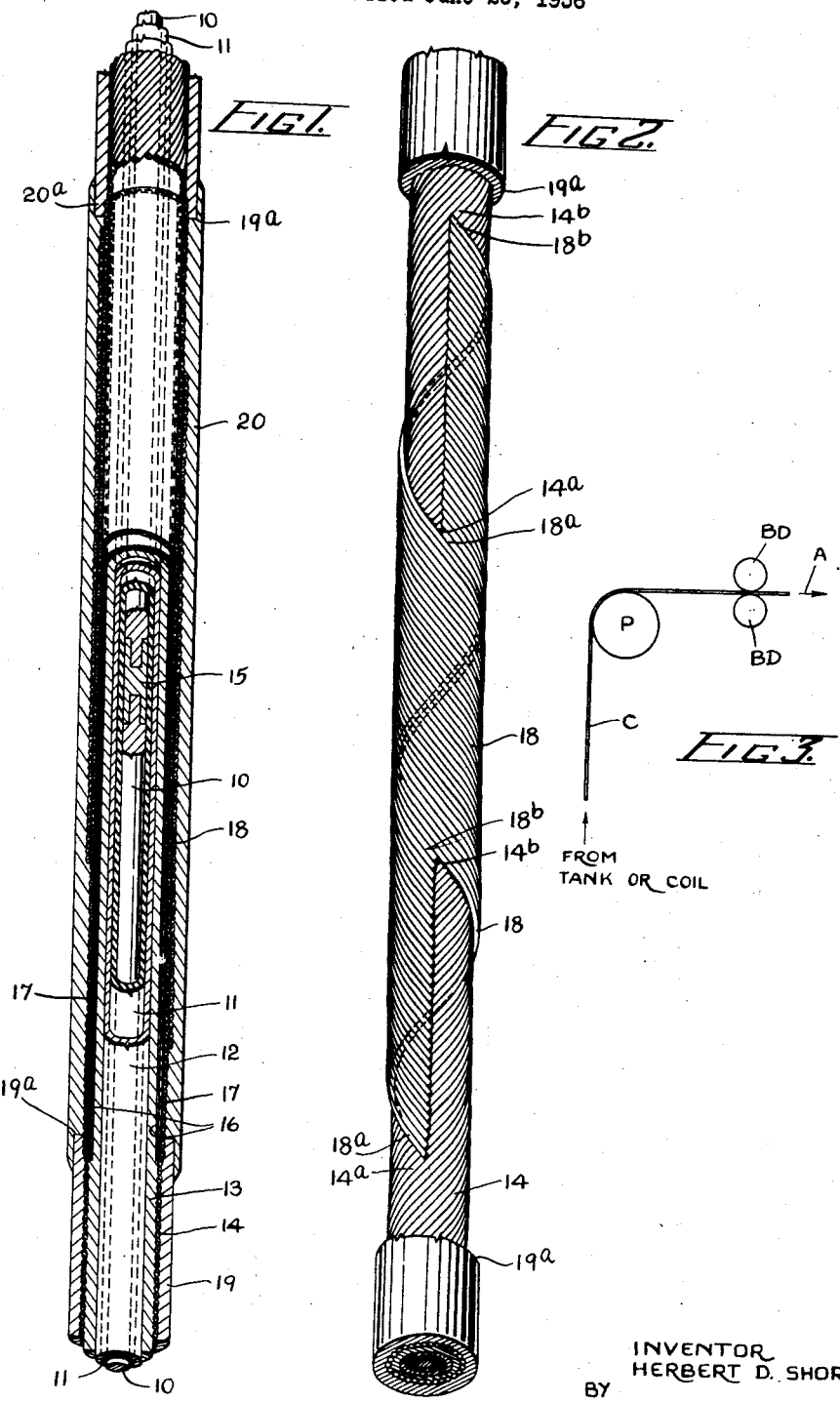

2,913,514

JOINTS IN ARMOURED CABLE

Herbert Douglass Short, Toronto, Ontario, Canada, assignor to Canada Wire and Cable Company Limited, Toronto, Ontario, Canada, a corporation of Canada Application June 25, 1956, Serial No. 593,683

Claims priority, application Canada June 7, 1956

4 Claims. (Cl. 174—90)

This invention relates to a method of reinforcing selected portions of an armoured cable for example, a cable in which the armour is formed by a plurality of wires wound helically around a core of the cable, adjacent armour wires being substantially in contact with one another throughout their length and the invention is specifically concerned with the problem of reinforcing the cable in the area where there is a joint in the current carrying conductor of the cable.

Armoured cable of the type to which this invention relates commonly comprises a central current carrying conductor, a surrounding insulating layer of fabric, rubber and/or impregnated paper over which lies a metal sheathing which, in turn, is surrounded by a suitable covering which forms a bed for the armour wires. The armour wires are arranged in a helix around the bedding over the sheath with adjacent wires substantially in contact with one another. The armour wires may themselves be further covered by a protective coating which forms a final outer sheath over the entire cable.

The invention is not concerned, however, with the specific form or the materials from which the cable is formed, except insofar as the armour wires consist of a plurality of parallel metal wires which are arranged helically around the protective and insulating layers of the conductor.

Throughout the following description the term "right hand" as applied to the direction of a helix of an armour wire means that when the cable is viewed along its axis, the helix recedes from the eye in a clockwise and axial direction. Conversely, the term "left hand" means that the helix recedes from the eye in an anti-clockwise and axial direction.

It is convenient to describe the problems which arise in the use of this type of cable in relation to one specific instance wherein the cable is used to span a body of water and lies along the bottom of the body of water. When submarine cable of the type which has been referred to above is laid, it is customary for the cable to be drawn from a storage coil or tank and passed over a pulley and through or around a braking mechanism which applies tension to that portion of the cable which has been already laid to control the rate of paying out or laying of the cable. It will be appreciated that since the cable is armoured by a number of helically wound armour wires, any tension which is exerted on the cable will tend to unlay the armour wires from their helical form and, as a result the cable twists in a direction opposite to that in which the armour wires are wound and, as a result, the armour wires are placed under a compressive force and the current carrying conductor is placed under a tension. In other words, if the armour wires are wound in a "right hand" direction the torque transmitted to the cable due to the applied tension will tend to cause the cable to twist in an anti-clockwise direction. It has been found in actual practice and in laboratory tests that a twisting of the cable in the direction to unlay the armour wires can impart a severe tension to the conductor. This tension is increased by any tension which is applied to the cable as a whole. If these forces are sufficiently great there is a tendency for the current carrying conductor to fracture at its weakest point which, it will be appreciated, is at a point where two lengths of conductor have been joined together within an integral cable length or where two lengths of cable have been themselves joined together.

Accordingly, it is a primary object of this invention to provide means for reinforcing a cable at a point where a joint in the current carrying conductor occurs to prevent the breakage of the current carrying conductor at this point.

It is a further object of this invention to provide such a means for reinforcing a cable which will not materially increase the diameter of the cable at the reinforced point.

It is a still further object of this invention to provide a means for reinforcing a helically wound armoured cable which will not alter the manufacturing processes for the remainder of the cable.

It is a final object of this invention to provide a means for reinforcing the joints of a helically wound armoured cable which may be effected at any time either during or after the completion of the manufacture of the cables.

According to the invention, a method of reinforcing selected portions of the armour of an armoured cable comprises the steps of exposing the helically wound armour wires at the selected portion, winding an equal number of reinforcing wires around the exposed armour wires in a helical manner of opposite hand to that of the armour wires and securing each reinforcing wire at each of its ends to a selected one of the said armour wires.

Other objects and advantages of the invention will become apparent in the following description when read in conjunction with the appended drawings in which like reference numerals refer to like parts in the various views and in which:

Figure 1 is a side elevation partly cut away and partly in section of a length of armoured cable, the current carrying conductor of which has been joined and the cable reinforced in accordance with the persent invention;

Figure 2 is a side elevation with the outer sheathing removed showing the reinforcing wires wound over the armour wires, and Figure 3 is a schematic view of a portion of a particular type of paying out mechanism which is sometimes used in laying the cable.

Referring now to Figure 1 the cable will be seen to comprise an inner current carrying conductor 10 which may consist of a bunch of metal filaments formed of, for example, copper, aluminum, or their alloys or a combination of them with other materials or, alternatively, may consist of a solid or hollow member. Surrounding the current carrying conductor 10 is a wrapping of layers of fabric, rubber and/or impregnated paper, one layer of which is shown at 11. A metallic sheath 12 which may conveniently be lead, is swaged or extruded over the layer 11, the sheath forming a water-impervious barrier protecting the layers of insulation and the current carrying conductor.

Surrounding the metallic sheath 12 lies a covering 13 which, in the drawings, is shown as a single layer but which may, in fact, comprise a number of separate layers. The covering 13 may conveniently be a serving or servings of bitumen impregnated jute which forms a bed for the armour wires 14 which, from Figure 2, will be seen to comprise a number of parallel helically wound metal wires which substantially touch one another along their length. In Figure 2 it will be observed that the armour wires are helically wound in a "right hand" manner, the wires receding in a clockwise and axial direction from the eye when the cable is viewed along its axis.

Since manufacturing techniques are such that it is only practical to manufacture the current carrying conductor in relatively short lengths compared with the total length which is required to span the distance over which the cable will ultimately be laid, it is necessary to join the lengths of conductor together in order to manufacture a final product of the required length. In order to join the current carrying conductors 10, a ferrule 15 is used which is provided with cylindrical sleeves at each end and which, from Figure 1, will be seen to have an H-form when viewed in axial cross section. The ends of the current carrying conductors 10 are reduced in diameter to fit within the cylindrical sleeves where they are welded, brazed or otherwise secured in position.

The joining of the current carrying conductors in this manner is done, of course, prior to the covering of them with the insulating layer, metallic sheath, bedding and armour wires, these layers being applied to the joined lengths of current carrying conductor in one of several manners all of which are well known in this and related arts.

In the practice of the invention in the case where the current carrying conductors 10 are joined in the above described manner prior to covering them with the various layers, each layer during the manufacture of the cable is marked at the joint area so that, when the armour wires are ultimately applied, the location of the joint will be readily discernable. In order to now reinforce the area in which the joint between the current carrying conductors occurs a number of reinforcing wires 18 are wound about the main armour wires 14 in a helical manner in a direction which is of opposite hand to that in which the armour wires are wound. Referring to Figure 2 it will be seen that the reinforcing wires 18 are wound in a helical manner in a "left hand" direction while the main armour wires 14 are wound in a helical manner in a "right hand" direction. The pitch of the reinforcing wires is made substantially greater than the pitch of the main armour wires so as to better withstand the tension at this point which produces a tendency in the main armour wires to unlay. As has been indicated earlier in this specification the tendency of the main armour wires to unlay produces high comperssive forces therein and produces a high tension within the conductor member which has the result of increasing the likelihood of fracture of the conductor at the joint area.

In securing the reinforcing wires 18 to the main armour wires 14 it is essential that any given reinforcing wire, for example, wire 18a be secured at one end to the same one of the main armour wires 14 to which it is secured at the other end. From a consideration of Figure 2 it will be observed that wire 18a is welded at one end to the main armour wire 14a and, at the other end, it is welded to the same one of the main armour wires, namely wire 14a. Similarly wire 18b of the reinforcing wires is welded at its one end to main armour wire 14b while, at the other end, it is welded to the same one of the main armour wires, namely wire 14b. Of course, the intermediate wires are also welded at each end to the same one of the main armour wires 14.

In the foregoing description there has been discussed the practice of the invention when the current carrying conductor is joined by means of the ferrule, presumably in the factory, prior to the wrapping of the conductor with the insulating and protecting layers. However, it is also contemplated to practice this invention in the field where two lengths of insulated and armoured cables are to be joined together in order to span a distance greater than can be spanned by lengths of cable which it is convenient to manufacture. In this practice of the invention the current carrying conductor is joined in the usual manner after the armour wires, protective layers and insulating layers have been peeled back a distance sufficient to enable the joining of the conductors to be carried out. Once the conductor has been joined the insulating layers are replaced and the metallic sheath is reinstated thereover. The bedding for the armour wires is replaced and the armour wires themselves are reinstated as closely as possible in their original helices with their ends butting against one another. Prior to reinstating the armour wires, however, a layer of metal foil is placed over the armour wire bedding and followed by a layer of asbestos and a final outer layer of metallic foil. When the armour wires are reinstated as closely as possible in their original helices the wires are butt welded end to end and followed, in the manner previously described, by a layer of reinforcing wires helically wound in a direction of opposite hand to the direction of the main armour wires. As was previously described the pitch of the reinforcing wires is substantially greater than the pitch of the main armour wires to increase the ability of the cable to withstand tension at this point.

The purpose of the layers of metallic foil and the layer of asbestos is to dissipate the heat and prevent the material forming the bedding from exuding between the armour wires and fouling the weld. Also it prevents the heat from the welding operation from damaging the bedding material and thereby weakening it and possibly enabling the armour wires to pierce the lead sheathing and admit moisture to the central core of the cable which would rapidly deteriorate it and render the cable useless.

Referring now to Figure 3 it will be seen that the cable indicated generally by the reference character C is drawn from the coil or tank and passed over a pulley P where its direction changes. The arrow A indicates the direction from which the cable carrying vehicle has travelled and the cable is being payed out in the direction of the arrow A. After the cable passes over the pulley P it may be passed between a pair of brake drums indicated by the reference characters BD which frictionally engage the cable and impart a tension to that portion of the cable on the side of the brake drums remote from the pulley P. It will be appreciated, of course, that the schematic diagram is illustrative of only one form which the paying out mechanism may take. Mechanisms of this sort are well known and vary widely in construction. However, since the paying out mechanism forms no part of this invention a schematic diagram is considered sufficient.

The tension which is imparted to the cable by the paying out mechanism tends to unlay the helically wound armour wires 14 and thus impart a torque to the cable as a whole which produces high compressive forces in the armour wires and thus imparts a tension to the current carrying conductor. As has been mentioned earlier, the weakest point of the current carrying conductor will normally lie at the ferrule 15 and the tension imparted to the conductor will tend to fracture the cable at this point.

By winding a series of reinforcing wires over the armour wires in a direction which is of opposite hand to that in which the main armour wires are wound, the twisting of the cable by the helically wound armour wires is prevented and the resultant tension coupled with the applied tension by the braking mechanism is prevented at this point and, as a result, the risk of fracture at the ferrule is eliminated. Each wire 18 of the reinforcing wires tends to resist the rotation of the cable and the unlaying of the corresponding main armour wire 14 to which it is welded at each end. Since there can be no twisting applied to the cable at the point where the reinforcing wires surround the armour wires, the likelihood of a break is eliminated or greatly reduced.

Referring once again to Figure 1 it will be seen that lying outside the main armour wires 14 and the reinforcing armour wires 18 is a final covering, serving or servings of a protective material which, prior to the application of the reinforcing wires 18, extended in an uninterrupted layer over the joint area. In order to apply the reinforcing wires to the joint area in the case where two lengths of cable are to be joined together the layer 19 has been peeled back to the point 19a as seen in Figs. 1 and 2. Following the application of the reinforcing wires a patch layer 20 of material similar to that comprising the layer 19 is applied to the reinforced area to completely enclose the reinforcing wires once more.

Obviously, if the reinforcing wires 18 are applied during the manufacture of the cable the final layer 19 will extend in an uninterrupted sheath over both the armour wires and the reinforcing wires.

From the foregoing description it will be appreciated that a method of reinforcing the cable in the area adjacent the ferrule in the conductor has been provided which obviates the danger of fracture of the conductor at the joint area. It will be appreciated that the method disclosed herein does not materially increase the diameter of the cable at the reinforced point, the increase in diameter being not much greater than twice the diameter of the reinforcing wires. It will also be appreciated that the reinforcing operation may be carried out either during the manufacture of the cable length in the case where two or more joined current carrying conductor members are being formed into one length of cable or where two completely insulated and armoured lengths of cable are to be joined together in the field.

While a specific embodiment of the invention has been described in detail with reference to the accompanying drawings it will be appreciated that this description is intended to be illustrative only and not limiting in any sense. The invention may be practised with minor modifications without departing from the spirit thereof or the scope of the subjoined claims.

What I claim is:

1. A locally reinforced armoured cable in which the armour consists of a layer of a number of parallel, helically wound armour wires, adjacent armour wires being substantially in contact with one another along their length and a central conductor having a joint therein, means for neutralizing the tendency of said armour layer to elongate under tension, said means comprising; a local reinforcing layer of wires comprising the same number of wires as in the armour layer, helically wound about the armour layer over the region of said conductor joint and in a direction of opposite hand to that in which the armour wires are wound and of substantially greater pitch, each of the reinforcing wires being secured only at each of its ends to only a corresponding selected one of the underlying armour wires.

2. A locally reinforced armoured cable comprising a central current carrying conductor having a joint therein and surrounded by at least one insulating layer, a local wrapping of sheet asbestos and metal foil over the insulating layer and over the region of said conductor joint, the asbestos wrapping being sandwiched between the layers of metal foil, an armour layer consisting of a number of parallel, helically wound armour wires, adjacent armour wires being substantially in contact with one another along their length, means for neutralizing the tendency of said armour layer to elongate under tension, said means comprising: a local layer of reinforcing wires equal in number to the number of armour wires and being helically wound about the armour wires over the region of said conductor joint in a direction which is of opposite hand to that in which the armour wires are wound and of substantially greater pitch, each of the reinforcing wires being secured only at each of its ends to only a corresponding selected one of the underlying armour wires.

3. A locally reinforced armoured cable in which the armour consists of a layer of a number of parallel helically wound armour wires, and a central conductor having a joint therein, means for neutralizing the tendency of said armour layer to elongate under tension, said means comprising; a local reinforcing layer of wires comprising the same number of wires as in the armour layer, helically wound about the armour layer over the region of said conductor joint in a direction of opposite hand to that in which the armour wires are wound and of substantially greater pitch, each of the reinforcing wires being secured only at each of its ends to only a corresponding selected one of the underlying armour wires.

4. A locally reinforced armoured cable comprising a central current carrying conductor having a joint therein surrounded by at least one insulating layer, a local wrapping of sheet asbestos and metal foil over the insulating layer and over the region of said conductor joint, the asbestos wrapping being sandwiched between the layers of metal foil, an armour layer consisting of a number of parallel, helically wound armour wires, means for neutralizing the tendency of said armour layer to elongate under tension, said means comprising; a local layer of reinforcing wires equal in number to the number of armour wires and being helically wound about the armour wires over the region of said conductor joint in a direction which is of opposite hand to that in which the armour wires are wound, each of the reinforcing wires being secured only at each of its ends to only a corresponding selected one of the underlying armour wires.

References Cited in the file of this patent

UNITED STATES PATENTS

| 312,405 | Thomas et al. | Feb. 17, 1885 |
| 321,240 | Patterson | June 30, 1885 |
| 2,442,193 | Brazier | May 25, 1948 |
| 2,604,509 | Blanchard | July 22, 1952 |
| 2,697,769 | Carpenter | Dec. 21, 1954 |
| 2,759,990 | Bean | Aug. 21, 1956 |

FOREIGN PATENTS

| 1,848 | Great Britain | Aug. 13, 1858 |
| 339,425 | Great Britain | Dec. 11, 1930 |
| 381,366 | Great Britain | Oct. 6, 1932 |